US011675334B2

(12) United States Patent
Zubarev et al.

(10) Patent No.: US 11,675,334 B2
(45) Date of Patent: *Jun. 13, 2023

(54) CONTROLLING A CHEMICAL REACTOR FOR THE PRODUCTION OF POLYMER COMPOUNDS

(71) Applicant: International Business Machines Corporation, Armonk, NY (US)

(72) Inventors: Dmitry Zubarev, San Jose, CA (US); Nathaniel H. Park, San Jose, CA (US); Victoria A. Piunova, Los Gatos, CA (US); Sarathkrishna Swaminathan, Santa Clara, CA (US); James L. Hedrick, Pleasanton, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 987 days.

This patent is subject to a terminal disclaimer.

(21) Appl. No.: 16/444,525

(22) Filed: Jun. 18, 2019

(65) Prior Publication Data
US 2020/0401110 A1    Dec. 24, 2020

(51) Int. Cl.
 G05B 19/4155    (2006.01)
 G06N 20/00    (2019.01)
 (Continued)

(52) U.S. Cl.
 CPC ...... G05B 19/4155 (2013.01); B01J 19/0006 (2013.01); B01J 19/0033 (2013.01);
 (Continued)

(58) Field of Classification Search
 CPC .................................................. G06N 20/00
 (Continued)

(56) References Cited

U.S. PATENT DOCUMENTS 6,029,157 A    2/2000   Mihatsch
6,587,845 B1   7/2003   Braunheim
 (Continued)

FOREIGN PATENT DOCUMENTS

CN    101414158 A    4/2009
CN    100511042      7/2009
 (Continued)

OTHER PUBLICATIONS

Richards et al. Measurement and control of polymerization reactors. Computers & chemical engineering, 30(10-12), pp. 1447 1463. (2006). 17 pages.
 (Continued)

*Primary Examiner* — Md Azad
*Assistant Examiner* — Md Abul Azad
(74) *Attorney, Agent, or Firm* — Amin, Turocy & Watson, LLP

(57) ABSTRACT

Techniques regarding the synthesis of one or more polymers of a target polymer class are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a recommendation component that can generate a recommended chemical reactor control setting for inverse synthesis of a polymer based on a target polymer characteristic and reactor training data.

15 Claims, 14 Drawing Sheets

(51) Int. Cl.
*G05B 13/02* (2006.01)
*B01J 19/00* (2006.01)

(52) U.S. Cl.
CPC ..... *G06N 20/00* (2019.01); *B01J 2219/00202* (2013.01); *B01J 2219/00234* (2013.01); *B01J 2219/00243* (2013.01); *G05B 2219/32375* (2013.01)

(58) Field of Classification Search
USPC .......................................................... 700/268
See application file for complete search history.

(56) References Cited

U.S. PATENT DOCUMENTS

| | | | |
|---|---|---|---|
| 7,611,756 B2 | 11/2009 | Pfeifer et al. | |
| 8,598,283 B2 | 12/2013 | Markel et al. | |
| 9,040,605 B2 | 5/2015 | Deshpande et al. | |
| 2016/0175829 A1 | 6/2016 | Bergens et al. | |
| 2017/0166690 A1 | 6/2017 | Matthews et al. | |
| 2017/0354946 A1 | 12/2017 | Cronin | |
| 2018/0165583 A1 | 6/2018 | Guiver et al. | |
| 2018/0304225 A1 | 10/2018 | Bourke, Jr. | |
| 2019/0295685 A1* | 9/2019 | Elemento | G16C 20/50 |
| 2020/0082916 A1* | 3/2020 | Polykovskiy | G06N 3/0454 |
| 2020/0098449 A1* | 3/2020 | Simonetta | G16C 20/90 |
| 2020/0150601 A1* | 5/2020 | Valpola | G05B 13/048 |
| 2020/0379442 A1* | 12/2020 | Chan | G05B 13/027 |
| 2021/0233620 A1* | 7/2021 | Cronin | G16C 20/10 |

FOREIGN PATENT DOCUMENTS

| | | |
|---|---|---|
| CN | 103226728 A | 7/2013 |
| CN | 106951919 | 7/2017 |
| CN | 107168255 A | 9/2017 |
| CN | 108416363 A | 8/2018 |
| CN | 109071708 | 12/2018 |
| CN | 109872780 A | 6/2019 |
| WO | 2007035485 | 3/2007 |
| WO | 2016116947 | 6/2016 |

OTHER PUBLICATIONS

Anonymous. Improved PP Impact Copolymers With High Molecular Weight Ethylene-Propylene Rubber. IPCOM000190556D. (2009). 3 pages.

Kim, et al. "Virtual screening of inorganic materials synthesis parameters with deep learning" NPJ Computational Materials vol. 3, Article No. 53 (2017). 9 pages.

Mell, Peter, et al. "The NIST Definition of Cloud Computing." National Institute of Standards and Technology. Sep. 2011. 7 pages.

Mutha et al. "On-line nonlinear model-based estimation and control of a polymer reactor." AIChE Journal, 43(11), pp. 3042-3058. (1997). 17 pages.

Kim et al. "Computational generative models of reaction conditions: Virtual screening of inorganic materials synthesis parameters with deep learning." NPJ Computational Materials vol. 3, Article No. 53 (2017). 9 pages.

Office Action for U.S. Appl. No. 16/444,565 dated Aug. 20, 2021, 40 pages.

International Search Report and Written Opinion for PCT Application Serial No. PCT/IB2020/054320 dated Aug. 17, 2020, 7 pages.

Final Office Action received for U.S. Appl. No. 16/444,565 dated Jan. 6, 2022, 40 pages.

List of IBM Patents or Applications Treated as Related.

* cited by examiner

CONTROLLING A CHEMICAL REACTOR FOR THE PRODUCTION OF POLYMER COMPOUNDS

BACKGROUND

The subject disclosure relates to controlling one or more chemical reactors for the production of one or more polymers, and more specifically, to generating one or more control settings for one or more chemical reactors for the inverse synthesis of one or more polymers based on one or more target polymer characteristics.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate autonomous experimental discovery and/or synthesis of one or more polymers are described.

According to an embodiment, a system is provided. The system can comprise a memory that can store computer executable components. The system can also comprise a processor, operably coupled to the memory, and that can execute the computer executable components stored in the memory. The computer executable components can comprise a recommendation component that can generate a recommended chemical reactor control setting for inverse synthesis of a polymer based on a target polymer characteristic and reactor training data.

According to an embodiment, a computer-implemented method is provided. The computer-implemented method can comprise generating, by a system operatively coupled to a processor, a recommended chemical reactor control setting for inverse synthesis of a polymer based on a target polymer characteristic and reactor training data.

According to an embodiment, a computer program product for controlling a chemical reactor to produce a polymer is provided. The computer program product can comprise a computer readable storage medium having program instructions embodied therewith. The program instructions can be executable by a processor to cause the processor to generate, by a system operatively coupled to the processor, a recommended chemical reactor control setting for inverse synthesis of the polymer based on a target polymer characteristic and reactor training data.

DETAILED DESCRIPTION

Figure 1:
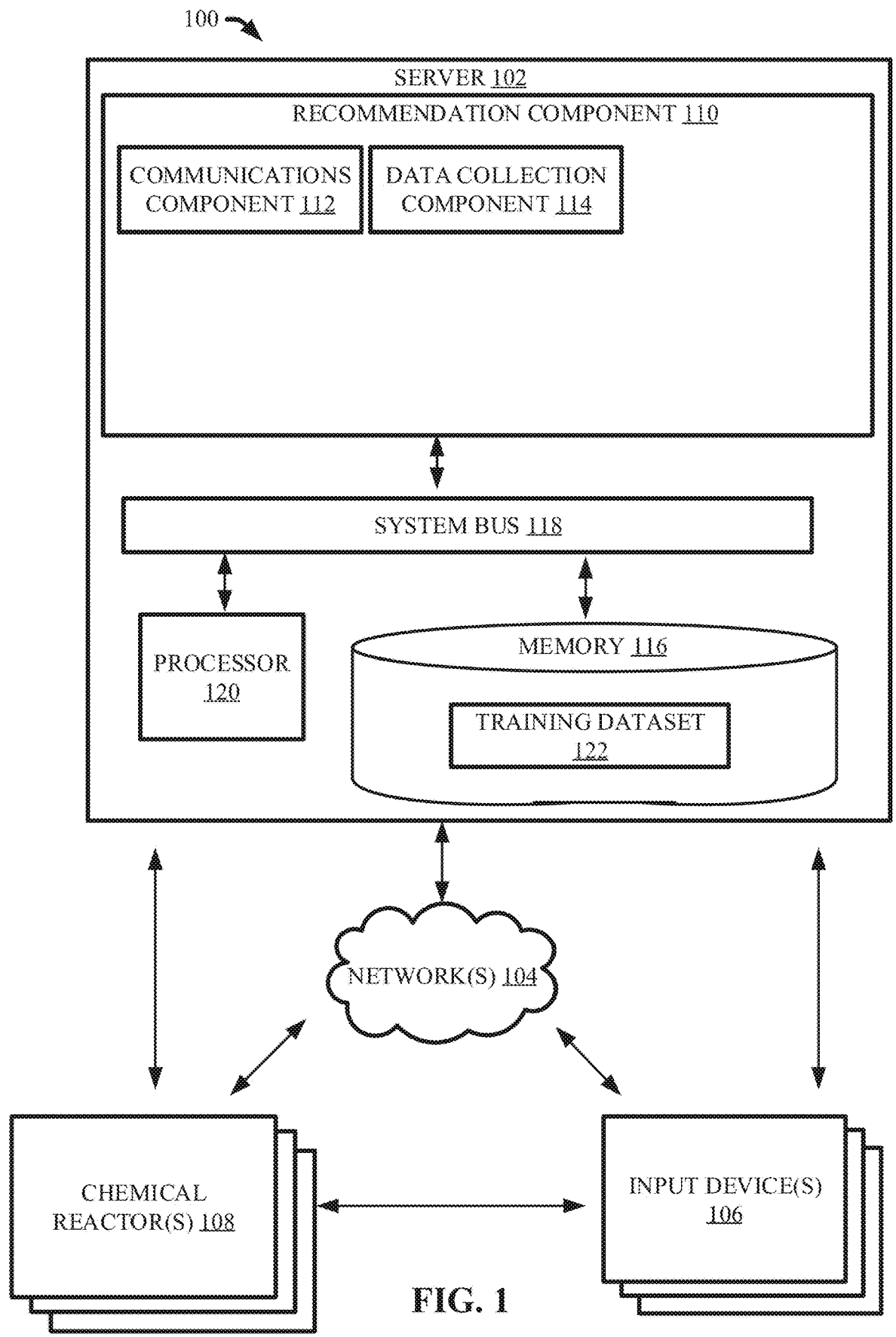
FIG. 1 illustrates a block diagram of an example, non-limiting system that can collect operation data regarding one or more chemical reactors and/or characteristics of one or more polymers synthesized by the one or more chemical reactors in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

For many life-science applications it is necessary to explore a particular class of polymer materials in order to determine optimal structure-activity or architecture-activity relationships. Manual synthesis of the members of such classes can be laborious and/or can rely solely on the discretion of the human experimentalist. Conventional experimentation techniques first predict a chemical structure of one or more polymers hypothesized to exhibit desired characteristics, then deduce a proposed synthesis scheme for generated the predicted chemical structure, and lastly determine one or more reactor control settings to facilitate implementation of the proposed synthesis scheme.

Various embodiments of the present invention can be directed to computer processing systems, computer-implemented methods, apparatus and/or computer program products that facilitate the efficient, effective, and autonomous (e.g., without direct human guidance) control of one or more chemical reactors using one or more recommendation components that can utilize one or more algorithms suitable for entry prediction in adjacency matrices. In one or more embodiments, the one or more recommendation components can serve as a computational source of actionable hypotheses about the settings of the particular synthetic platform that are expected to carry out synthesis of a material that belongs to a target class of the materials according to its structure, property, and activity. For example, one or more embodiments can comprise training the one or more recommendation components based on previous operation of one or more chemical reactors and/or the characteristics of synthesized polymer materials. Thereby, the trained recommendation components can generate one or more recommended chemical reactor control settings based on one or more target polymer characteristics. Additionally, the system can autonomously operate one or more chemical reactors in accordance with the recommended chemical reactor control settings and/or further train the one or more recommendation components based on measurements of the resulting polymer materials.

The computer processing systems, computer-implemented methods, apparatus and/or computer program products employ hardware and/or software to solve problems that are highly technical in nature (e.g., experimental discovery and/or synthesis of polymer materials of target polymer class), that are not abstract and cannot be performed as a set of mental acts by a human. For example, by combining one or more recommendation components for reactor inputs and a synthetic platform, such as a flow reactor or a batch reactor, one or more systems described herein can remove the need for a human from the exploration of the classes of polymers and/or facilitate production of unexpected candidates that could typically be overlooked by a human. Further, an individual, or a plurality of individuals, cannot achieve the synthetic accessibility of the various embodiments described herein at least because the described computational hypothesis can be immediately acted upon by the synthetic platform via the autonomous system.

As used herein, the term "target polymer class" can refer to one or more types and/or categories of polymer materials that exhibit physical and/or chemical properties within a defined range. As used herein, the term "target polymer characteristic" and/or "target polymer characteristics" can refer to one or more parameters of a polymer material that can be measured and/or detected to define the upper and/or lower bounds of a target polymer class. As used herein the term, "inverse synthesis" can refer to the synthesis of one or more polymer materials belonging to a target polymer class based on one or more similarities between the properties of one or more synthesis inputs and target polymer characteristics.

FIG. 1 illustrates a block diagram of an example, non-limiting system 100 that can facilitate autonomous discovery and/or synthesis of one or more polymer materials based on one or more target polymer characteristics in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, one or more input devices 106, and/or one or more chemical reactors 108. The server 102 can comprise recommendation component 110. The recommendation component 110 can further comprise communications component 112 and/or data collection component 114. Also, the server 102 can comprise or otherwise be associated with at least one memory 116. The server 102 can further comprise a system bus 118 that can couple to various components such as, but not limited to, the recommendation component 110 and/or associated components, memory 116 and/or a processor 120 While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or chemical reactors 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the recommendation component 110 can be provided on the one or more servers 102, it should be appreciated that the architecture of system 100 is not so limited. For example, the recommendation component 110, or one or more components of the recommendation component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the one or more servers 102 and/or chemical reactors 108. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

The one or more chemical reactors 108 can comprise one or more synthesis platforms such as flow reactors and/or batch reactors. For example, the one or more chemical reactors 108 can facilitate flow chemistry in which one or more chemical reactions can be performed in a continuously flowing stream of chemical reactants (e.g., using one or more pumps to propel chemical fluids through one or more tubes). In another example, the one or more chemical reactors 108 can facilitate batch chemistry. Example chemical reactors 108 can include, but are not limited to: tubular reactors, fixed bed reactors, fluid bed reactors, continuous stirred tank reactors, a combination thereof, and/or the like.

The data collection component 114 can collect training data from the one or more input devices 106 and/or chemical reactors 108 (e.g., via a direct electrical connection and/or the one or more networks 104). The training data can regard one or more previous operations of the one or more chemical reactors 108. For example, the training data can include, but is not limited to, the following operation settings regarding one or more chemical reactions previously performed by the one or more chemical reactors 108: chemical reactants, monomers, catalysts, co-catalysts, initiators, retention time, temperature, flow rate, pressure, the order of component addition/mixing, exposure to ultraviolet radiation and/or other radiation, a combination thereof, and/or the like. For instance, the one or more chemical reactors 108 can send one or more operation settings to the data collection component 114 via the one or more networks 104 and/or communications component 112. Additionally, operation settings (e.g., regarding previous operations of the one or more chemical reactors 108) can be entered into the system 100 and/or sent to the data collection component 114 by a user of the system 100 using the one or more input devices 106 via the one or more networks 104 and/or communications component 112.

Further, the training data can regard one or more characteristics of one or more polymers. For example, the training data can regard one or more characteristics of one or more polymers synthesized by operation of the one or more chemical reactors 108. For instance, the training data can include, but is not limited to, the following polymer characteristics: chemical structure, chemical properties, chemical activity, conversion, physical properties (e.g., molecular weight, polydispersity index ("PDI"), ultraviolet-visible spectrum, infra-red spectrum, elongation, tensile strength, temperature of glass transition, and/or solubility), biological activity, therapeutic activity, a combination thereof, and/or the like. The one or more chemical reactors 108 can send one or more characteristics of synthesized polymers to the data collection component 114 via the one or more networks 104 and/or communications component 112. Additionally, polymer characteristics (e.g., regarding polymers synthesized by the one or more chemical reactors 108) can be entered into the system 100 and/or sent to the data collection component 114 by a user of the system 100 using the one or more input devices 106 via the one or more networks 104 and/or communications component 112.

In one or more embodiments, the data collection component 114 can generate and/or populate one or more training datasets 122 with the training data collected from the one or more input devices 106 and/or chemical reactors 108. For example, the data collection component 114 can generate and/or populate the one or more training datasets 122 with operation settings of the one or more chemical reactors 108 and/or polymer characteristics of one or more synthesized polymers (e.g., synthesized by the one or more chemical reactors 108). As shown in FIG. 1, the one or more training datasets 122 can be comprised within the one or more memories 116. In various embodiments, the one or more training datasets 122 can be comprised within one or more cloud computing environments.

In one or more embodiments, a user of the system 100 can enter one or more target polymer characteristics into the system 100 via the one or more input devices 106. For example, the one or more target polymer characteristics can define one or more target classes of polymers. For instance, the one or more target polymer characteristics can define the lower and/or upper bounds of one or more characteristics of a class of polymers targeted for synthesis by the system 100. In various embodiments, the one or more target polymer characteristics can regard any of the various features described by the training data.

Figure 2:
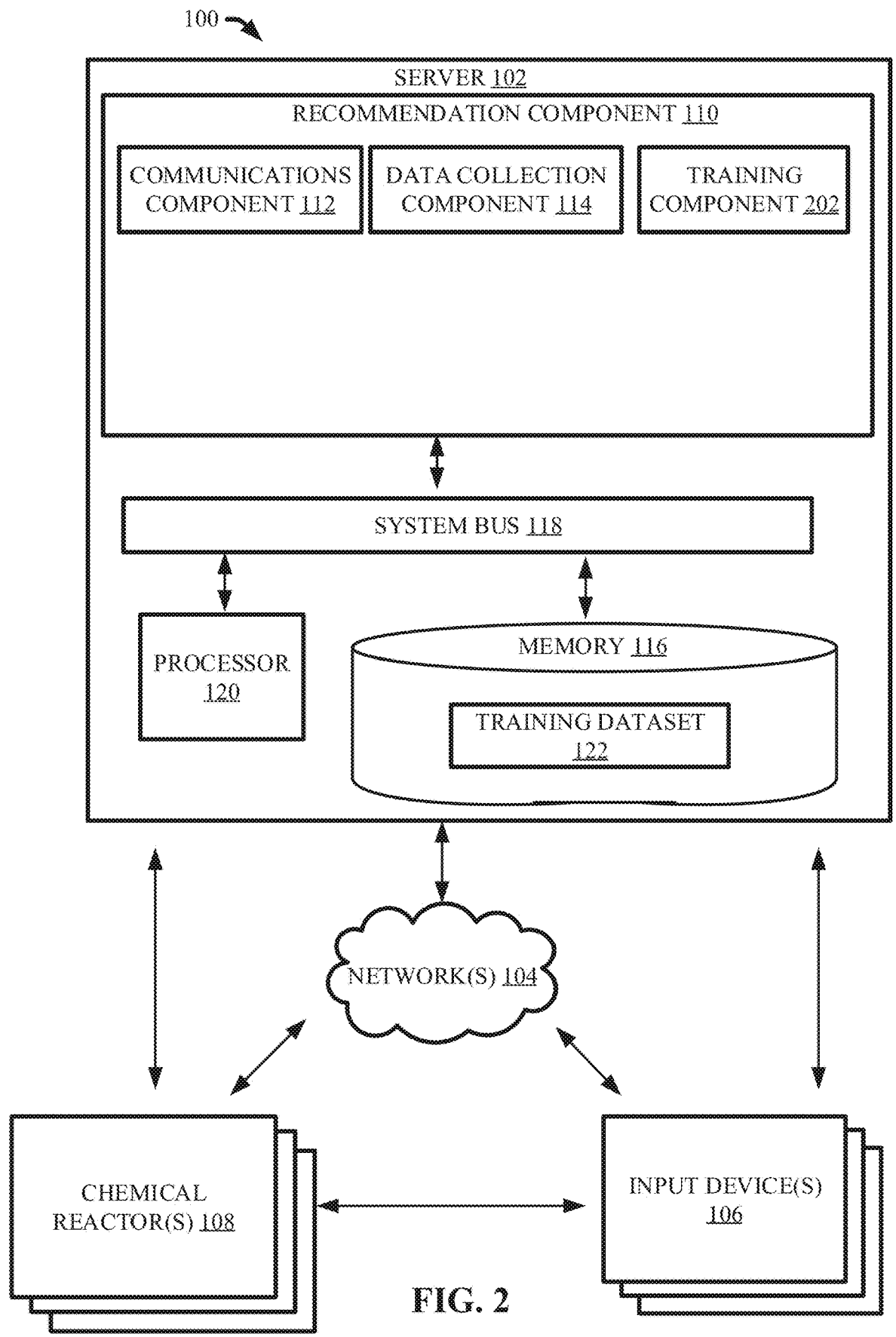
FIG. 2 illustrates a block diagram of an example, non-limiting system that can perform one or more machine learning techniques using chemical reactor operation data and/or data regarding one or more polymers synthesized by the one or more chemical reactors in accordance with one or more embodiments described herein.

FIG. 2 illustrates a diagram of the example, non-limiting system 100 that can further comprise training component 202 in accordance with one or more embodiments described herein. Repetitive description of like elements employed in other embodiments described herein is omitted for sake of brevity. In various embodiments, the training component 202 can analyze the one or more training datasets 122 using one or more machine learning algorithms. For example, the training component 202 can generate one or more adjacency matrices and/or perform one or more latent embeddings to facilitate training the recommendation component 110.

Figure 3:
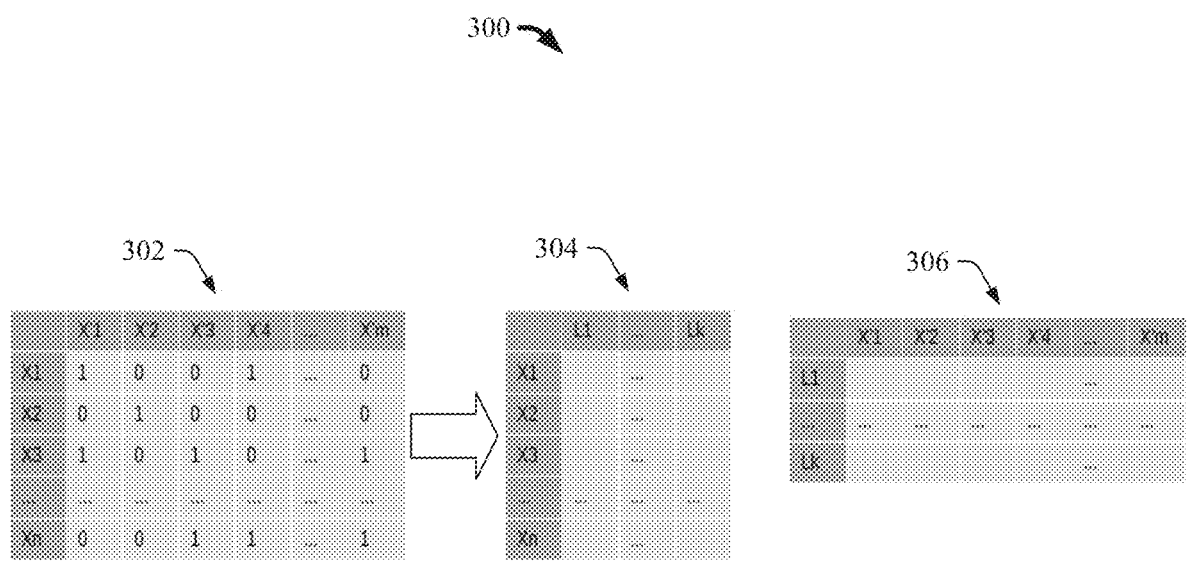
FIG. 3 illustrates a diagram of an example, non-limiting adjacency matrix and/or latent embedding processes that can be generated by one or more machine learning techniques using chemical reactor operation data and/or data regarding one or more polymers synthesized by the one or more chemical reactors in accordance with one or more embodiments described herein.

FIG. 3 illustrates a diagram of an example, non-limiting training process 300 that can be implemented by the training component 202 in accordance with one or more embodiments described herein. Repetitive description of like elements employed in other embodiments described herein is omitted for sake of brevity.

As shown in FIG. 3, the training component 202 can generate one or more initial adjacency matrices 302, which can comprise training data included in the one or more training datasets 122. FIG. 3 depicts an exemplary initial adjacency matrix 302 that can be generated by the training component 202. For example, rows and/or columns of the initial adjacency matrix 302 can comprise chemical reactor 108 control settings (e.g., "X" can represent a first control setting and/or "X'" can represent a second control setting). For instance, the rows of the initial adjacency matrix 302 can regard monomers utilized in previous operations of the one or more chemical reactors 108, and/or the columns of the initial adjacency matrix 302 can regard catalysts utilized in previous operations of the one or more chemical reactors 108 (e.g., wherein "X1" can represent a first monomer and/or "X'1" can represent a first catalyst).

As shown in the exemplary initial adjacency matrix 302 of FIG. 3, entries of the initial adjacency matrix 302 can be the value 1 if the polymer material synthesized with the respective chemical reactor 108 control settings had polymer characteristics of a target polymer class (e.g., wherein the target polymer class can be defined by one or more target polymer characteristics entered into the system 100 via the one or more input devices 106). Additionally, entries of the initial adjacency matrix 302 can be the value 0 if the polymer material synthesized with the respective chemical reactor 108 control settings had polymer characteristics outside of the target polymer class. Further, entries of the initial adjacency matrix 302 can be the value 0 if the there is a lack of pre-existing data regarding the associated control settings. For example, the target polymer class can be defined by a target polymer characteristic of a molecular weight greater than or equal to 1000 Daltons (da) and less than or equal to 1500 da, and the polymer synthesized with monomer "X3" and catalyst "X'1" of the exemplary adjacency matrix of FIG. 3 can be within the target polymer class (e.g., having a molecular weight of 1100 da) and thereby represented by a value of 1 (e.g., as shown in FIG. 3).

Additionally, the training component 202 can perform one or more embedding processes to generate one or more embedding matrices. For example, the training component 202 can generate one or more latent space embeddings of the column labels of the one or more initial adjacency matrices 302 to generate one or more first embedding matrices 304 and/or of row labels of the one or more initial adjacency matrices 302 to generate one or more second embedding matrices 306. In various embodiments, the embedded column and/or row labels can be close in a procedure-specific geometric sense if the respective entry in the initial adjacency matrix 302 has a value of 1. For example, the one or more embedding processes can comprise a non-negative matrix factorization algorithm and/or closeness of the row and/or column labels after embedding can be evaluated as a dot product of the respective embedding vectors.

As shown in FIG. 3, the one or more embedding processes can generate one or more latent k-dimensional embeddings of the column and/or row labels of the one or more initial adjacency matrices 302 (e.g., embeddings of one or more chemical reactor 108 control settings of one or more previous operations of the chemical reactors 108). Additionally, the training process 300 can involve one or more iterative searches for the one or more embeddings (e.g., represented by "L" in FIG. 3) that can satisfy criteria specific to the subject embedding process. For example, wherein the embedding process is a form of non-negative matrix factorization, the embedding search (e.g., embedding vectors for rows and/or columns) can be driven by minimization of the distance between the adjacency matrix and one or more dot products of the embedding matrices (e.g., first embedding matrix 304 and/or second embedding matrix 306 shown in FIG. 3). In various embodiments, the training component 202 can store the one or more initial adjacency matrices 302 and/or latent embeddings (e.g., first embedding matrices 304 and/or second embedding matrices 306) within the one or more memories 116 and/or share the one or more adjacency matrices and/or latent embeddings with one or more associate components of the recommendation component 110.

While FIG. 3 illustrates an exemplary training process 300 with regards to two training data variables (e.g., two control settings represented by "X" and/or "X'") and/or two embedding matrices, the architecture of the one or more training processes 300 described herein are not so limited. For example, the training component 202 can perform one or more training processes 300 with regards to more than two training data variables (e.g., more than two control settings) by combining training data variables (e.g., control settings) into tuples (e.g., control setting tuples. Additionally, the training component 202 can generate multiple initial adjacency matrices 302 for pairwise combinations.

Figure 4:
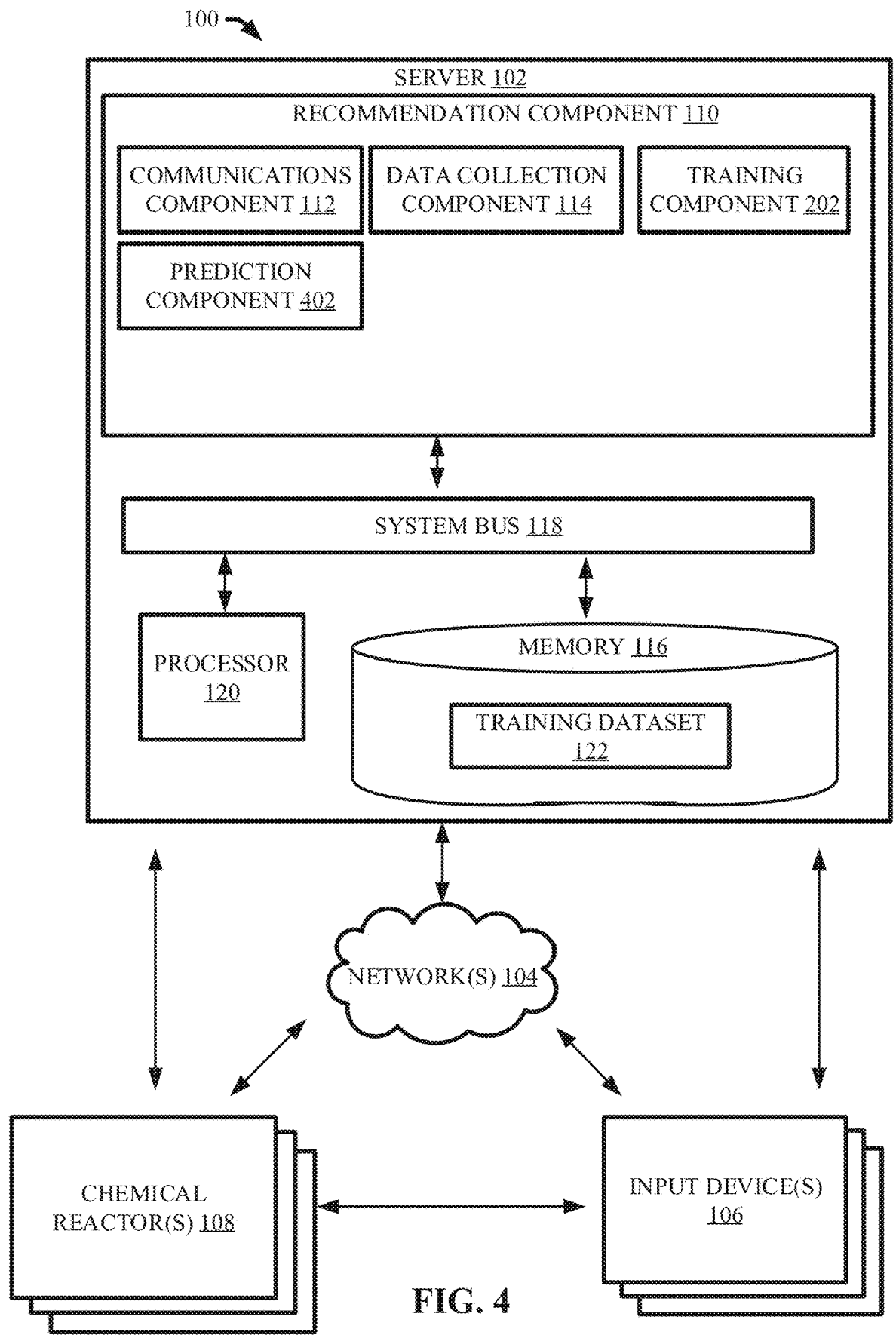
FIG. 4 illustrates a block diagram of an example, non-limiting system that can predict one or more chemical reactor control settings that can facilitate synthesis of a polymer with target characteristics in accordance with one or more embodiments described herein.

FIG. 4 illustrates a diagram of the example, non-limiting system 100 that can further comprise prediction component 402 in accordance with one or more embodiments described herein. Repetitive description of like elements employed in other embodiments described herein is omitted for sake of brevity. In various embodiments, the prediction component 402 can generate one or more recommended chemical reactor 108 control settings that can be predicted to achieve a synthesis of one or more polymers within the target polymer class when implemented by the one or more chemical reactors 108.

Figure 5:
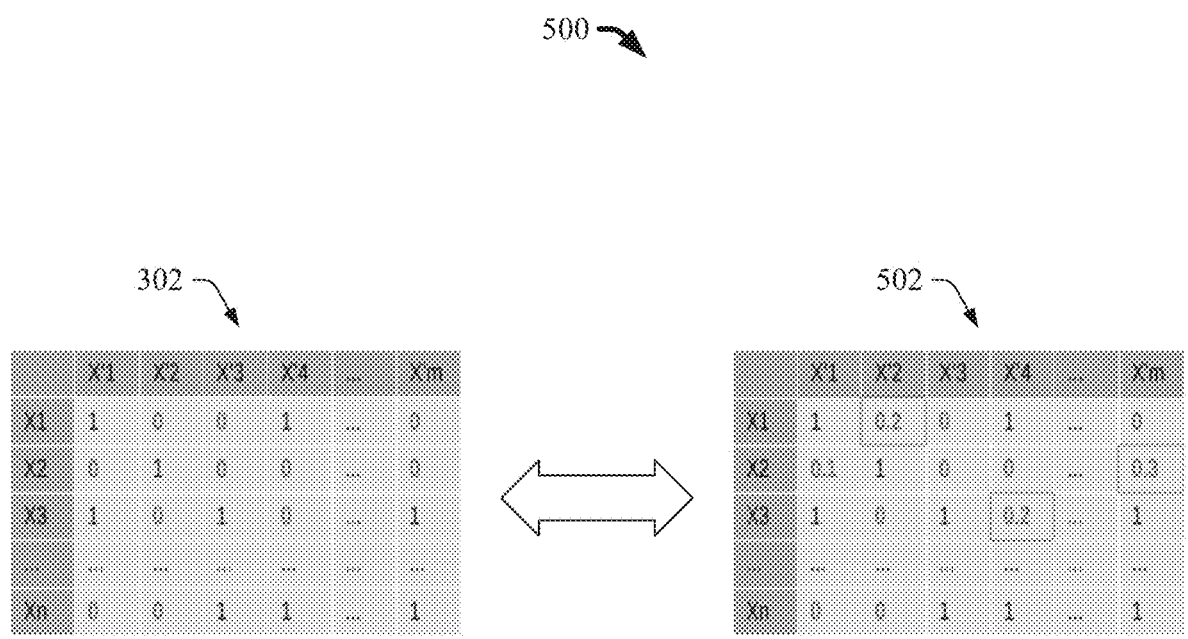
FIG. 5 illustrates a diagram of an example, non-limiting prediction process that can be implemented by one or more systems to predict one or more chemical reactor control settings that can facilitate synthesis of a polymer with target characteristics in accordance with one or more embodiments described herein.

FIG. 5 illustrates a diagram of an example, non-limiting prediction process 500 that can be implemented by the prediction component 402 in accordance with one or more embodiments described herein. Repetitive description of like elements employed in other embodiments described herein is omitted for sake of brevity. In various embodiments, the prediction process 500 can comprise a link prediction in network process, such as matrix factorization and/or deep learning models applied to the one or more adjacency matrices.

In one or more embodiments, can reconstruct the one or more initial adjacency matrices 302 based on the embeddings generated by the training component 202 to generate one or more reconstructed adjacency matrices 502. For instance, FIG. 5 depicts an exemplary initial adjacency matrix 302 and an exemplary reconstructed adjacency matrix 502 generated based on the one or more embedding processes performed by the training component 202. For example, the one or more reconstructed adjacency matrices 502 can be generated by the prediction component 402 from the latent embedding matrices (e.g., first embedding matrix 304 and/or second embedding matrix 306) according to one or more specifics of the one or more embedding processes performed by the training component 202. For instance, the one or more reconstructed adjacency matrices 502 can be dot products of the embedding matrices (e.g., first embedding matrix 304 and/or second embedding matrix 306), wherein the one or more embedding processes comprises a matrix factorization and/or the like. The one or more reconstructed adjacency matrices 502 can minimize the Frobenius norm of the divergence between the one or more initial adjacency matrices 302 and reconstructed adjacency matrices 502.

In various embodiments, the prediction component 402 can perform one or more comparison processes, wherein the one or more initial adjacency matrices 302 and/or reconstructed adjacency matrices 502 can be compared entry-wise by the prediction component 402 to identify one or more recommended chemical reactor 108 control settings. For example, wherein a subject entry has a value of zero in the one or more initial adjacency matrices 302 and a non-zero value in the one or more reconstructed adjacency matrices 502, the row and/or column labels (e.g., the chemical reactor 108 control settings) associated with the subject entry can be identified by the prediction component 402 as recommended chemical reactor 108 control settings to facilitate synthesis of one or more polymers comprised within the subject target polymer class (e.g., as defined by one or more target polymer characteristics).

Additionally, the one or more comparison processes can be implemented by the prediction component 402 in accordance with one or more defined recommendation thresholds (e.g., defined by one or more users of the system 100 via the one or more input devices 106 and/or networks 104). For example, the prediction component 402 can identify entries as associated with recommended chemical reactor 108 control settings, wherein the subject entries have a value greater than or equal to the one or more recommendation threshold values within the one or more reconstructed adjacency matrices 502. For instance, wherein the recommended threshold value is 0.15, the prediction component 402 can identify one or more entries within the reconstructed adjacency matrices 502 having a value greater than or equal to 0.15 and less than 1 as associated with recommended chemical reactor 108 control settings. As shown in FIG. 5, the following chemical reactor 108 control settings can be recommended by the prediction component 402 in accordance with a recommendation threshold of 0.15: control setting X1 in combination with control setting X'2, control setting X2 in combination with control setting X'm, and/or control setting X3 in combination with control setting X'4. Thus, the prediction component 402 can predict that implementation of the one or more recommended chemical reactor 108 control settings can facilitate synthesis of one or more polymers comprised within a target polymer class based on one or more link predictions in network, such as the one or more comparison processes.

Figure 6:
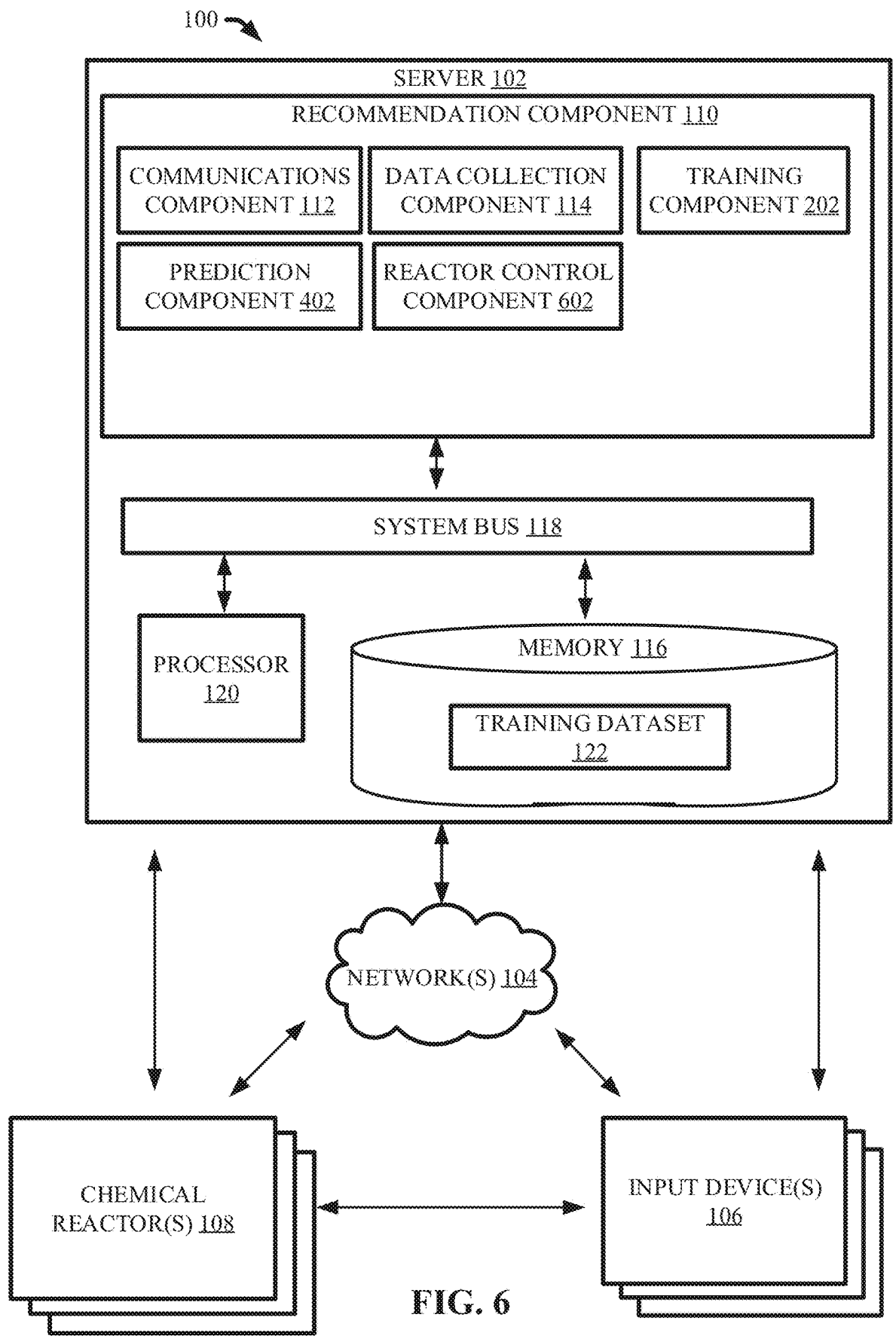
FIG. 6 illustrates a block diagram of an example, non-limiting system that can operate one or more chemical reactors based on one or more recommended chemical reactor settings in accordance with one or more embodiments described herein.

FIG. 6 illustrates a diagram of the example, non-limiting system 100 further comprising reactor control component 602 in accordance with one or more embodiments described herein. Repetitive description of like elements employed in other embodiments described herein is omitted for sake of brevity. In various embodiments, the reactor control component 602 can operate the one or more chemical reactors 108 in accordance with the one or more recommended chemical reactor 108 control settings generated by the prediction component 402. While FIG. 6 depicts the reactor control component 602 comprised within the one or more servers 102, the architecture of the system 100 is not so limited. For example, the reactor control component 602 can be comprised within the one or more chemical reactors 108, the one or more input devices 106, and/or a cloud computing environment (e.g., accessible via the one or more networks 104).

In one or more embodiments, the reactor control component 602 can set and/or alter one or more control settings of the one or more chemical reactors 108 based on the one or more recommended chemical reactor 108 control settings. Additionally, the reactor control component 602 can initiate, suspend, resume, and/or cease operation of the one or more chemical reactors 108. Wherein the system 100 comprises a plurality of chemical reactors 108, the reactor control component 602 can further determine which chemical reactor 108 to implement the recommended chemical reactor 108 control settings based on one or more reactor characteristics of the one or more chemical reactors 108. Example reactor characteristics can include, but are not limited to: operational status of the one or more chemical reactors 108, chemical compounds (e.g., reagents, catalysts, and/or initiators) readily accessible by the one or more chemical reactors 108, the types of chemical reactors 108 comprised within the system 100, one or more user preferences (e.g., entered into the system 100 via the one or more input devices 106), a combination thereof, and/or the like.

In one or more embodiments, the reactor control component 602 can autonomously implement the one or more recommended chemical reactor 108 control settings. Thereby, the production time of discovering and/or synthesizing one or more polymers within a target polymer class based on target polymer characteristics and historic data (e.g., training data) can be reduced and/or minimized by the autonomous nature of the system 100.

Figure 7:
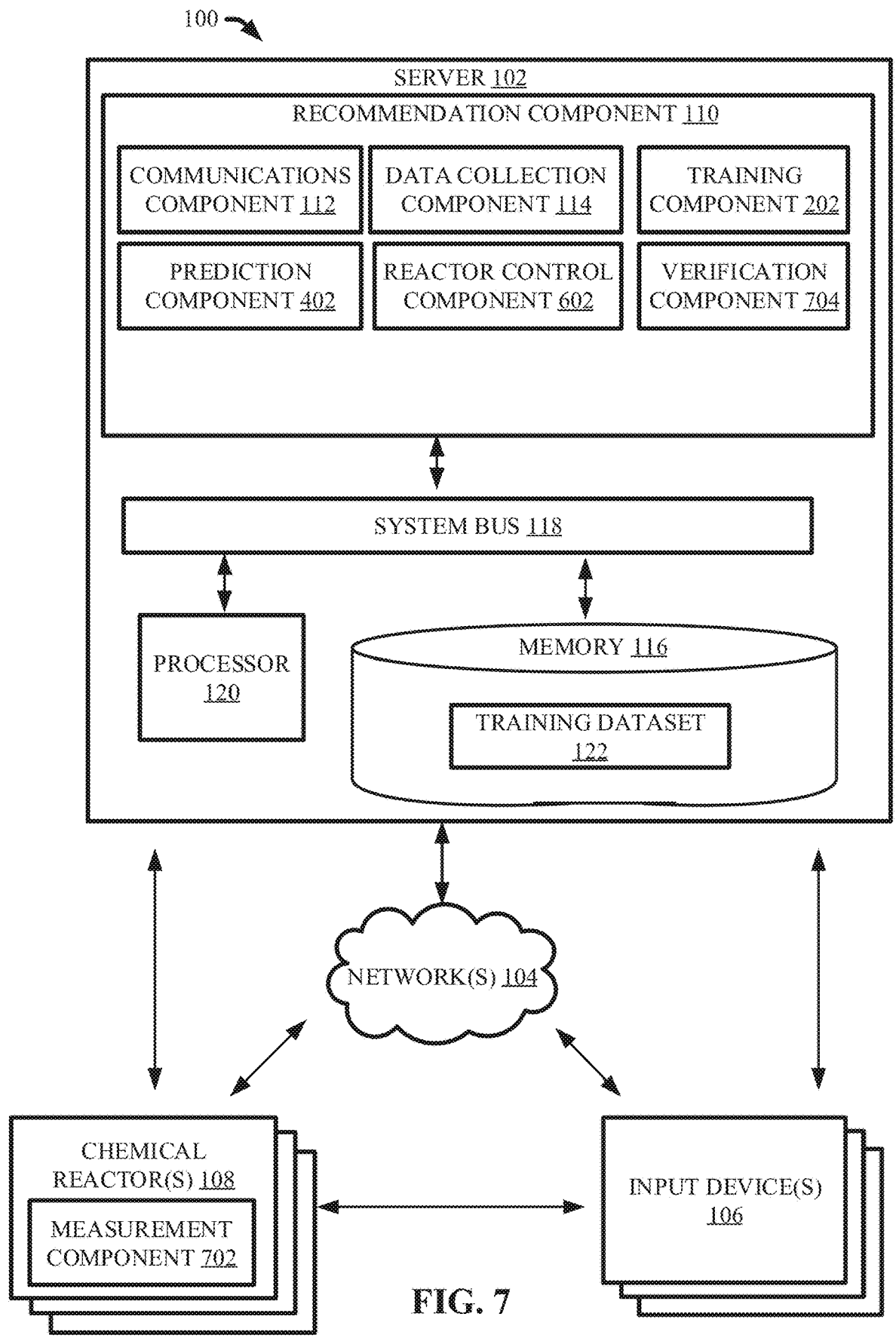
FIG. 7 illustrates a block diagram of an example, non-limiting system that can measure one or more characteristics of one or more synthesized polymers and/or determine whether the measured characteristics align with one or more target characteristics in accordance with one or more embodiments described herein.

FIG. 7 illustrates a diagram of the example, non-limiting system 100 further comprising one or more measurement components 702 and/or verification components 704 in accordance with one or more embodiments described herein. Repetitive description of like elements employed in other embodiments described herein is omitted for sake of brevity. In various embodiments, the one or more measurement components 702 can measure and/or detect one or more characteristics of polymers synthesized by the one or more chemical reactors 108, and/or the verification component 704 can determine whether the subject characteristics comply with the one or more target polymer characteristics.

For example, the one or more chemical reactors 108 can comprise one or more measurement components 702 that can measure and/or detect one or more characteristics of polymer materials generated by the one or more chemical reactors 108 operated (e.g., via the reactor control component 602) in accordance with the one or more recommended chemical reactor 108 control settings. In various embodiments, each of the chemical reactors 108 can comprise one or more measurement components 702. Example characteristics that can be measured and/or detected by the one or more measurement components 702 can include, but are not limited to: chemical structure, chemical properties, chemical activity, conversion, physical properties (e.g., molecular weight, PDI, ultraviolet-visible spectrum, infra-red spectrum, elongation, tensile strength, temperature of glass transition, and/or solubility), biological activity, therapeutic activity, a combination thereof, and/or the like. Example sensors that can be comprised within and/or controlled by the one or more measurement components 702 can include, but are not limited to: timers, thermometers, calorimeters, spectroscopic equipment, equipment for mechanical testing, biochemical assays, a combination thereof, and/or the like.

In one or more embodiments, the verification component 704 can analyze one or more of the characteristics measured and/or detected by the one or more measurement components 702 to determine whether the one or more synthesized polymer materials belong to the target polymer class. For example, the verification component 704 can determine whether the one or more synthesized polymer materials exhibit one or more polymer characteristics compliant with the one or more target polymer characteristics (e.g., entered via the one or more input devices 106) that can define the target polymer class. Additionally, the verification component 704 can share the recommended chemical reactor 108 control settings, the characteristics obtained from the one or more measurement components 702, and/or the determinations generated by the verification component 704 with one or more users of the system 100 via the one or more input devices 106 and/or networks 104.

Figure 8:
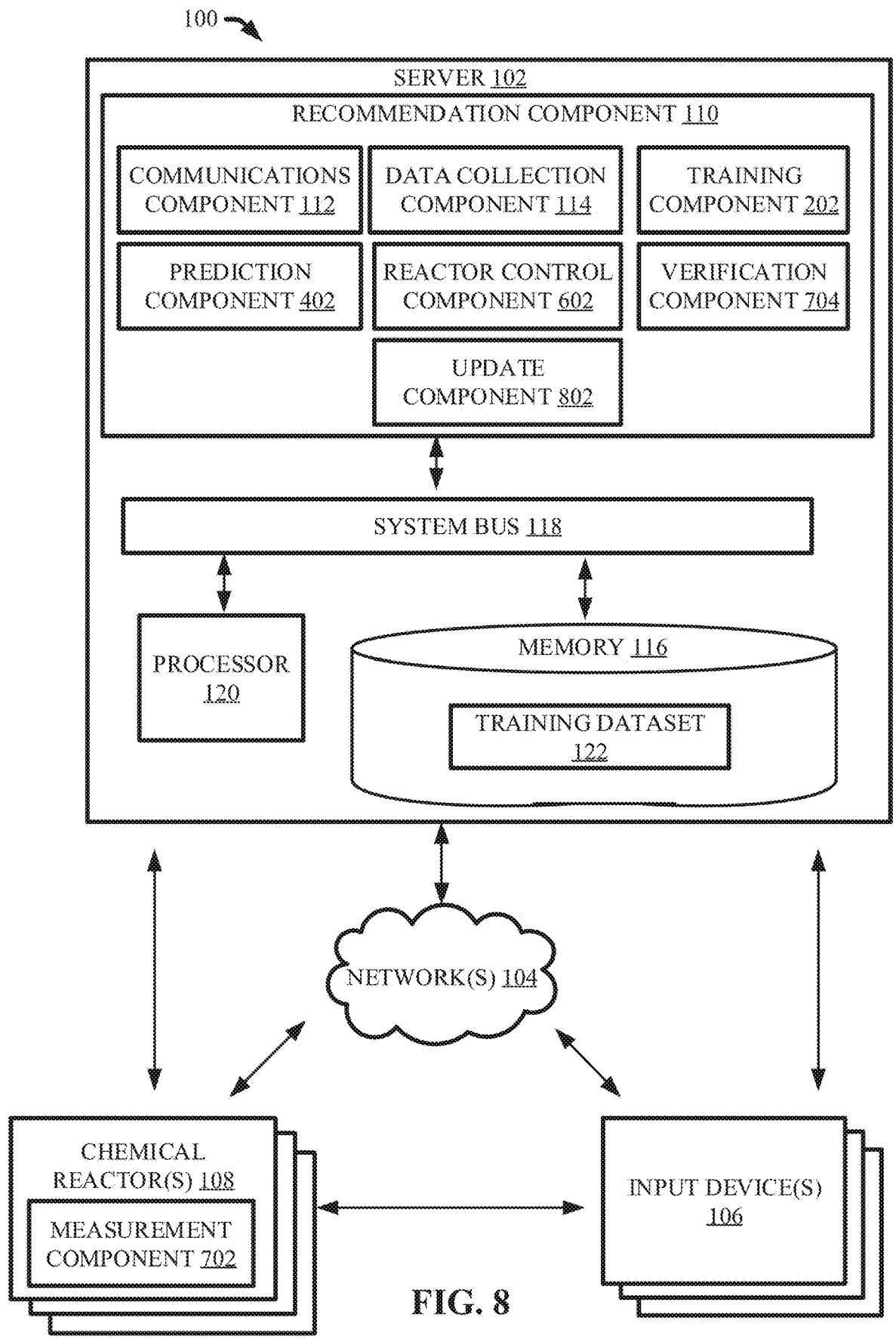
FIG. 8 illustrates a block diagram of an example, non-limiting system that can update one or more training datasets based on one or more polymers synthesized by recommended chemical reactor control settings in accordance with one or more embodiments described herein.

FIG. 8 illustrates a diagram of the example, non-limiting system 100 further comprising one or more update components 802 in accordance with one or more embodiments described herein. Repetitive description of like elements employed in other embodiments described herein is omitted for sake of brevity. In various embodiments, the update component 802 can further populate and/or update the training data comprised within the one or more training datasets 122 based on the: recommended chemical reactor 108 control settings, chemical reactor 108 operations performed in accordance with the recommended chemical reactor 108 control settings, and/or polymer materials synthesized by the one or more chemical reactors 108 (e.g., as measured and/or detected by the one or more measurement components 702).

Thereby, more and more training data can be made available to the training component 202 as the one or more chemical reactors 108 synthesis more and more polymers (e.g., in accordance with recommended chemical reactor 108 control settings). In various embodiments, the system 100 can autonomously: grow the amount of training data comprised within the one or more training datasets 122, increase the accuracy of recommended chemical reactor 108 control settings, and/or operate the one or more chemical reactors 108 to synthesize new polymer materials within a target polymer class.

Figure 9:
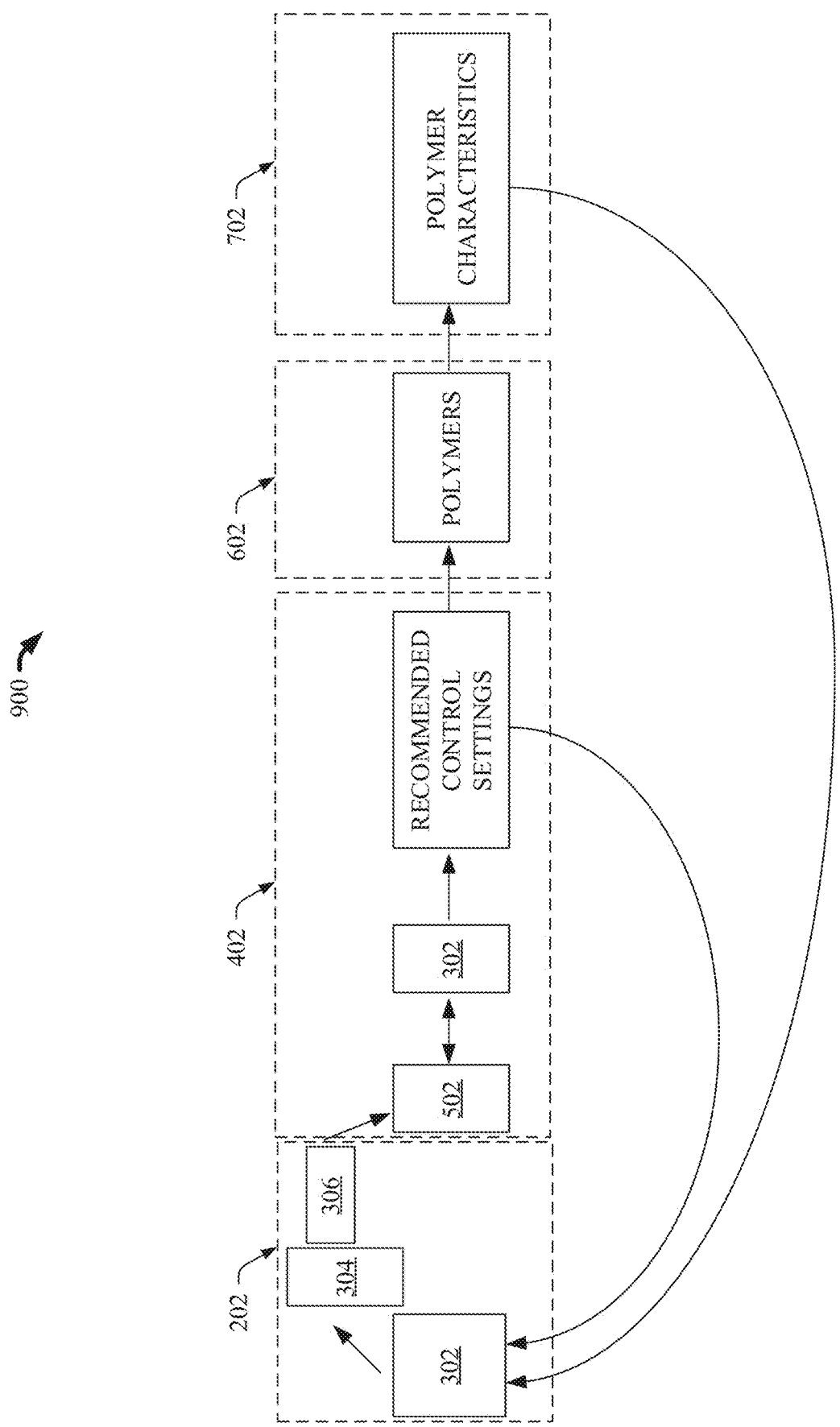
FIG. 9 illustrates a diagram of an example, non-limiting system that can facilitate the discovery and/or synthesis of one or more polymer compounds based on previous operation of one or more chemical reactors and/or target polymer characteristics in accordance with one or more embodiments described herein.

FIG. 9 illustrates a diagram of the example non-limiting operating procedure 900 that can be performed by the system 100 in accordance with one or more embodiments described herein. Repetitive description of like elements employed in other embodiments described herein is omitted for sake of brevity.

As shown in FIG. 9, the training component 202 can generate one or more initial adjacency matrices 302 and/or perform one or more embedding processes. As described herein, the training component 202 can generate the one or more initial adjacency matrices 302 based on the training data collected by the data collection component 114 (e.g., wherein collection can be facilitated by the one or more networks 104 and/or the communications component 112). Further, the training component 202 can compute one or more latent embeddings of the one or more initial adjacency matrices 302 (e.g., generating first embedding matrix 304 and/or second embedding matrix 306).

The prediction component 402 can thereby generate one or more reconstructed adjacency matrices 502 based on the one or more embedding processes performed by the training component 202. Additionally, in various embodiments the prediction component can compare the one or more reconstructed adjacency matrices 502 with the one or more initial adjacency matrices 302 to generate one or more recommended chemical reactor 108 control settings, as described herein. The one or more recommended chemical reactor 108 control settings can regard one or more control settings that are predicted to facilitate synthesis of one or more polymers of a target polymer class when implemented to operate one or more chemical reactors 108. In one or more embodiments, the prediction component 402 can generate the one or more recommended chemical reactor 108 control settings based on one or more recommendation thresholds.

The reactor control component 602 can operate one or more chemical reactors 108 in accordance with the one or more recommended chemical reactor 108 control settings to synthesize one or more polymers. Additionally, the one or more measurement components 702 can measure and/or detect one or more polymer characteristics of the synthesized polymers. In various embodiments, the verification component 704 can further determine whether the one or more synthesized polymers belong to the target polymer class based on the measured and/or detected polymer characteristics. As shown in FIG. 9, in various embodiments the recommended chemical reactor 108 control settings and/or the polymer characteristics of the synthesized polymers can further contribute to the one or more training processes 300 performed by the training component 202. For example, the update component 802 can populate and/or update the one or more training datasets 122 with the recommended chemical reactor 108 control settings and/or the polymer characteristics of the synthesized polymers; thereby, enabling the recommended chemical reactor 108 control settings and/or the polymer characteristics of the synthesized polymers to be included in one or more iterations of the one or more training processes 300 (e.g., included in one or more initial adjacency matrices 302 generated by the training component 202).

Figure 10:
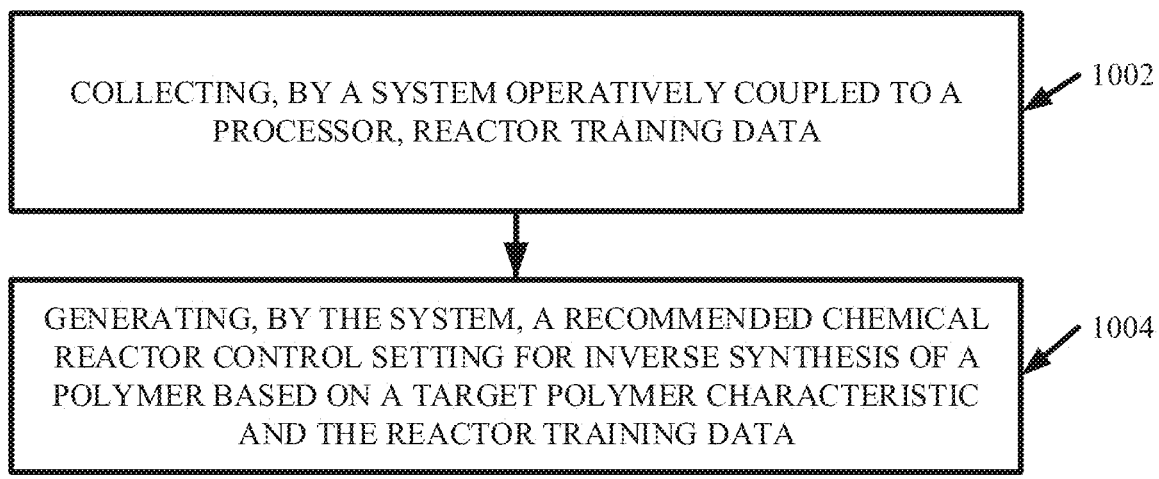
FIG. 10 illustrates a flow diagram of an example, non-limiting method that can facilitate controlling one or more chemical reactors to generate one or more polymer compounds having one or more target characteristics based, for example, previous operation of one or more chemical reactors in accordance with one or more embodiments described herein.

FIG. 10 illustrates a flow diagram of an example, non-limiting method 1000 that can facilitate inverse synthesis of one or more polymers based on training data and/or one or more target polymer characteristics in accordance with one or more embodiments described herein. Repetitive description of like elements employed in other embodiments described herein is omitted for sake of brevity.

At 1002, the method 1000 can comprise collecting (e.g., via data collection component 114), by a system 100 operatively coupled to one or more processors 120, reactor training data. For example, the reactor training data can regard one or more previous operations of one or more chemical reactors 108 (e.g., flow reactors, batch reactors, a combination thereof, and/or the like). For example, the reactor training data can include, but is not limited to, the following operation settings regarding one or more chemical reactions previously performed by the one or more chemical reactors 108: chemical reactants, monomers, catalysts, co-catalysts, initiators, retention times, temperature, flow rate, pressure, the order of component addition/mixing, exposure to ultraviolet radiation and/or other radiation, a combination thereof, and/or the like. In addition, the collecting at 1002 can further comprise collecting training data regarding one or more polymer characteristics of one or more polymers synthesized by the one or more chemical reactors 108.

At 1004, the method 1000 can comprise generating (e.g., via training component 202 and/or prediction component 402), by the system 100, one or more recommended chemical reactor 108 control settings for inverse synthesis of one or more polymers based on one or more target polymer characteristics and/or the reactor training data. For example, the reactor training data can be utilized by the prediction component 402 to implement one or more link prediction in network specified by one or more adjacency matrices with single or multiple partitions (e.g., as described herein), such as matrix factorization, tensor factorization, and/or deep learning models applied to one or more adjacency matrices. The one or more recommended chemical reactor 108 control settings can be one or more control settings that the system 100 predicts can facilitate synthesis of a polymer belonging to a target polymer class when implanted on the one or more chemical reactors 108.

In various embodiments, the method 1000 can further comprise operating the one or more chemical reactors 108 (e.g., via reactor control component 602) in accordance with the one or more recommended chemical reactor 108 control settings. Additionally, the method 1000 can comprise monitoring the characteristics of polymers synthesized by the operation of the one or more chemical reactors 108 to further train the system 100 and/or increase the accuracy of generated recommended chemical reactor 108 control settings.

Figure 11:
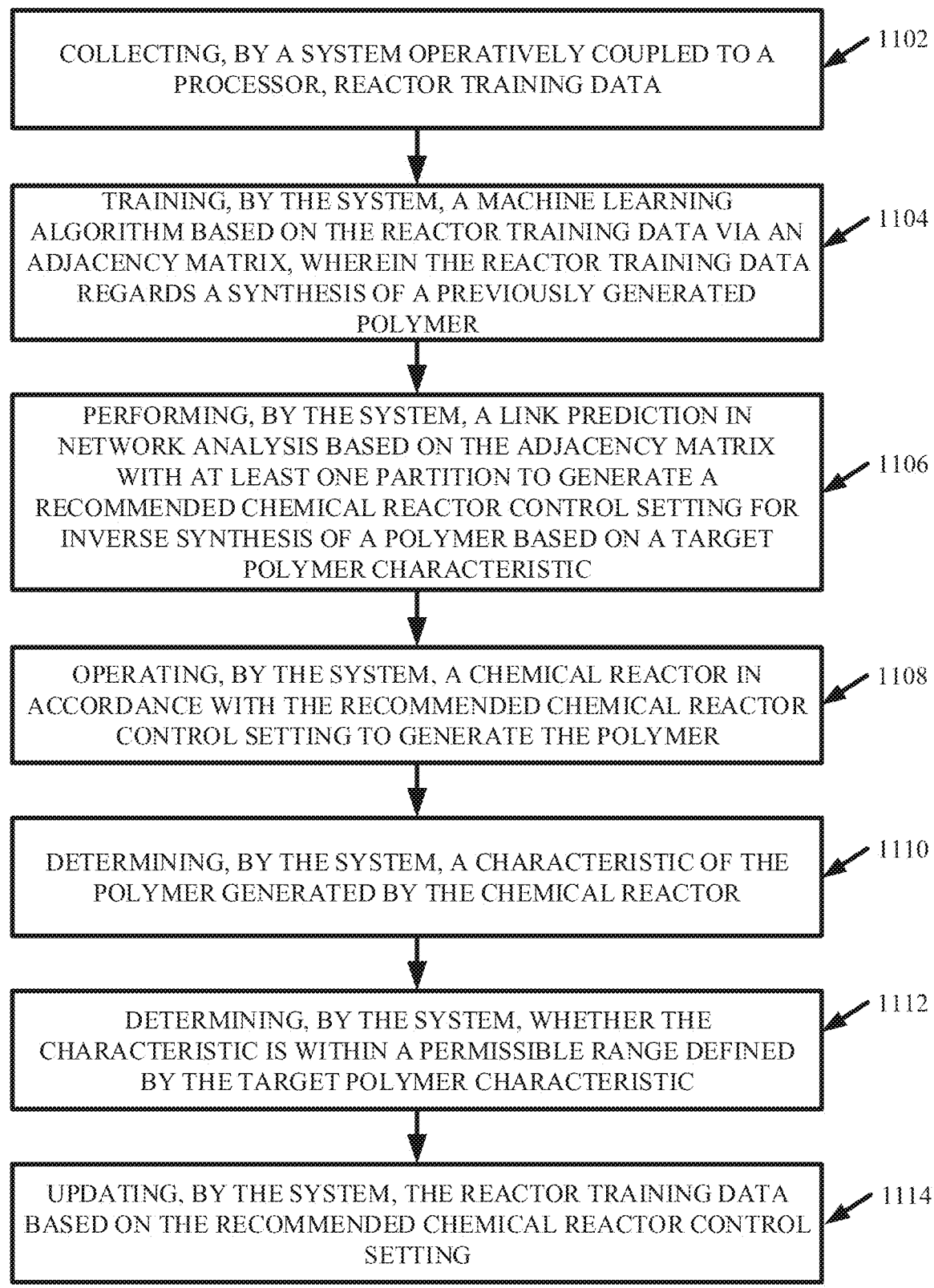
FIG. 11 illustrates a flow diagram of an example, non-limiting method that can facilitate controlling one or more chemical reactors to generate one or more polymer compounds having one or more target characteristics based, for example, previous operation of one or more chemical reactors in accordance with one or more embodiments described herein.

FIG. 11 illustrates a flow diagram of an example, non-limiting method 1100 that can facilitate inverse synthesis of one or more polymers based on training data and/or one or more target polymer characteristics in accordance with one or more embodiments described herein. Repetitive description of like elements employed in other embodiments described herein is omitted for sake of brevity.

At 1102, the method 1100 can comprise collecting (e.g., via data collection component 114), by a system 100 operatively coupled to one or more processors 120, reactor training data. For example, the reactor training data can regard one or more previous operations of one or more chemical reactors 108 (e.g., flow reactors, batch reactors, a combination thereof, and/or the like). For example, the reactor training data can include, but is not limited to, the following operation settings regarding one or more chemical reactions previously performed by the one or more chemical reactors 108: chemical reactants, monomers, catalysts, co-catalysts initiators, retention time, temperature, flow rate, pressure, the order of component addition/mixing, exposure to ultraviolet radiation and/or other radiation, a combination thereof, and/or the like. In addition, the collecting at 1102 can further comprise collecting training data regarding one or more polymer characteristics of one or more polymers synthesized by the one or more chemical reactors 108.

At 1104, the method 1100 can comprise training (e.g., via training component 202), by the system 100, a machine learning algorithm based on the reactor training data via one or more adjacency matrices, wherein the reactor training data can regard the synthesis of one or more previously generated polymers. For example, the machine learning algorithm can comprise generation of the one or more adjacency matrices and/or one or more embedding processes. For instance, the one or more embedding processes of the machine learning algorithm can compute latent space embedding of the various column and/or row labels of the one or more adjacency matrices.

At 1106, the method 1100 can comprise performing (e.g., via prediction component 402), by the system 100, one or more link prediction in network analysis based on the one or more adjacency matrices with at least one partition to generate one or more recommended chemical reactor 108 control settings for inverse synthesis of one or more polymers based on one or more target polymer characteristics. For example, the one or more link prediction in network analysis can comprise matrix factorization, tensor factorization, and/or one or more deep learning models applied to the one or more adjacency matrices. For instance, the one or more link prediction in network analysis can comprise the generation of one or more reconstructed adjacency matrices based on the embedding processes performed during the training at 1104 and/or an entry-wise comparison between the one or more adjacency matrices and reconstructed adjacency matrices.

At 1108, the method 1100 can comprise operating (e.g., via reactor control component 602), by the system 100, one or more chemical reactors 108 in accordance with the one or more recommended chemical reactor 108 control settings to generate the one or more polymers. In various embodiments, operating the one or more chemical reactors 108 at 1108 can be performed autonomously by the system 100.

At 1110, the method 1100 can comprise determining (e.g., via measurement component 702), by the system 100, one or more characteristics of the one or more polymers generated by the one or more chemical reactors 108. For example, the one or more chemical reactors 108 can comprise one or more sensors to measure and/or detect one or more physical and/or chemical properties of the one or more synthesized polymers. Example sensors can include, but are not limited to: timers, thermometers, calorimeters, spectroscopic equipment, equipment for mechanical testing, biochemical assays, a combination thereof, and/or the like.

At 1112, the method 1100 can comprise determining (e.g., via verification component 704), by the system 100, whether the one or more characteristics are within a permissible range defined by the one or more target polymer characteristics. For example, the determining at 1112 can comprise analyzing the one or more measurements and/or detections generated at 1110 to determine whether the one or more synthesized polymers belong to the target polymer class.

At 1114, the method 1100 can comprise updating (e.g., via update component 802), by the system 100, the reactor training data based on the one or more recommended chemical reactor 108 control settings. Further, the updating at 1114 can comprise updating one or more training datasets 122 based on the one or more measurements and/or detections generated at 1110. In various embodiments, the updating at 1114 can facilitate one or more iterations of the training conducted at 1104.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
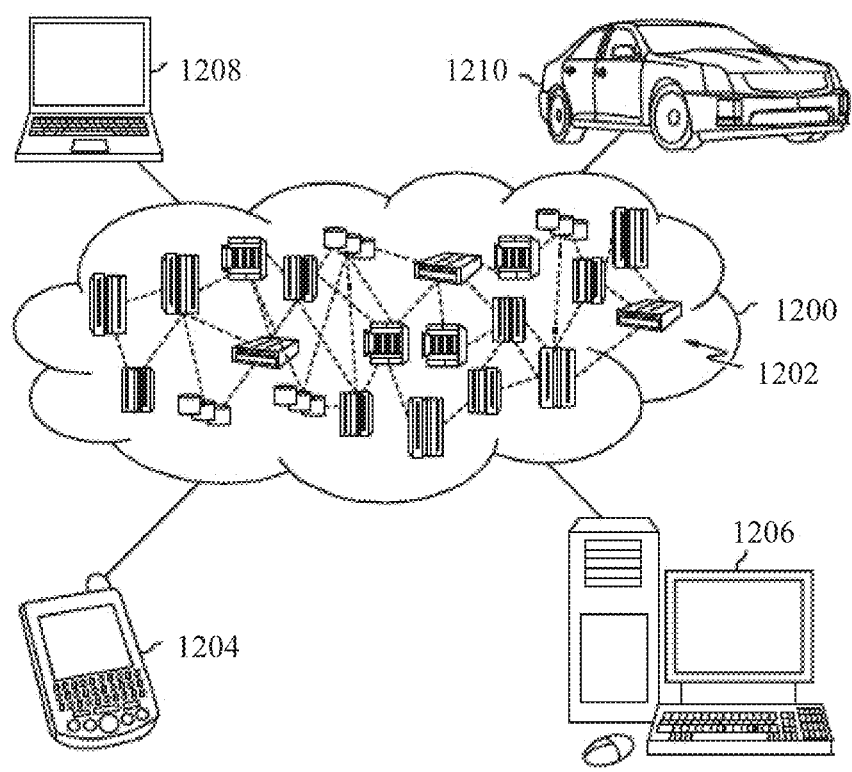
FIG. 12 depicts a cloud computing environment in accordance with one or more embodiments described herein.

Referring now to FIG. 12, illustrative cloud computing environment 1200 is depicted. As shown, cloud computing environment 1200 includes one or more cloud computing nodes 1202 with which local computing devices used by cloud consumers, such as, for example, personal digital assistant (PDA) or cellular telephone 1204, desktop computer 1206, laptop computer 1208, and/or automobile computer system 1210 may communicate. Nodes 1202 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1204-1210 shown in FIG. 12 are intended to be illustrative only and that computing nodes 1202 and cloud computing environment 1200 can communicate with any type of computerized device over any type of network and/or network addressable connection (e.g., using a web browser).

Figure 13:
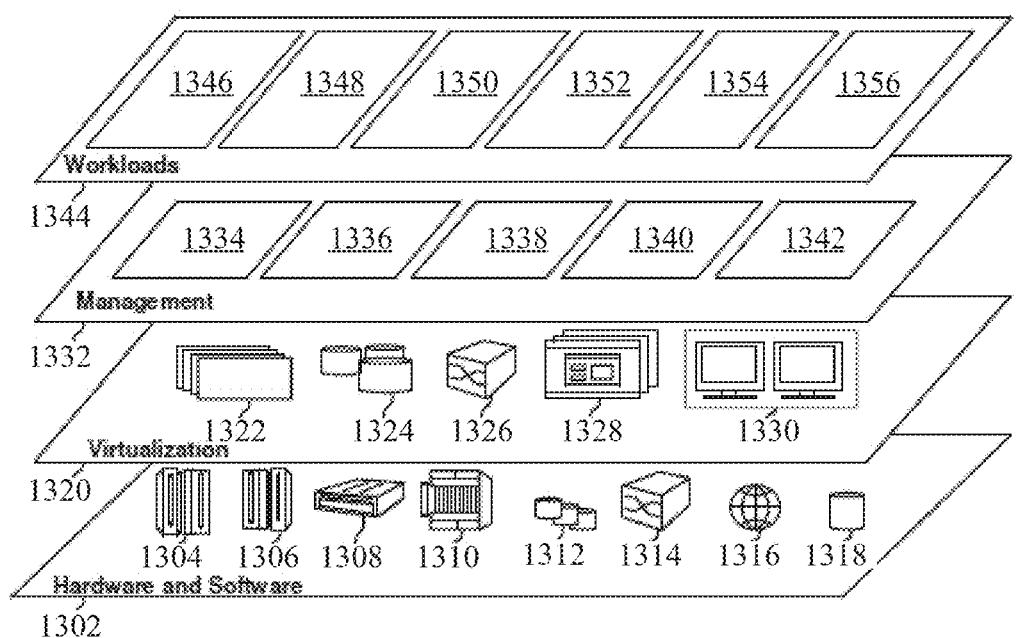
FIG. 13 depicts abstraction model layers in accordance with one or more embodiments described herein

Referring now to FIG. 13, a set of functional abstraction layers provided by cloud computing environment 1200 (FIG. 12) is shown. Repetitive description of like elements employed in other embodiments described herein is omitted for sake of brevity. It should be understood in advance that the components, layers, and functions shown in FIG. 13 are intended to be illustrative only and embodiments of the invention are not limited thereto. As depicted, the following layers and corresponding functions are provided.

Hardware and software layer 1302 includes hardware and software components. Examples of hardware components include: mainframes 1304; RISC (Reduced Instruction Set Computer) architecture based servers 1306; servers 1308; blade servers 1310; storage devices 1312; and networks and networking components 1314. In some embodiments, software components include network application server software 1316 and database software 1318.

Virtualization layer 1320 provides an abstraction layer from which the following examples of virtual entities may be provided: virtual servers 1322; virtual storage 1324; virtual networks 1326, including virtual private networks; virtual applications and operating systems 1328; and virtual clients 1330.

In one example, management layer 1332 may provide the functions described below. Resource provisioning 1334 provides dynamic procurement of computing resources and other resources that are utilized to perform tasks within the cloud computing environment. Metering and Pricing 1336 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1338 provides access to the cloud computing environment for consumers and system administrators. Service level management 1340 provides cloud computing resource allocation and management such that required service levels are met. Service Level Agreement (SLA) planning and fulfillment 1342 provide pre-arrangement for, and procurement of, cloud computing resources for which a future requirement is anticipated in accordance with an SLA.

Workloads layer 1344 provides examples of functionality for which the cloud computing environment may be utilized. Examples of workloads and functions which may be provided from this layer include: mapping and navigation 1346; software development and lifecycle management 1348; virtual classroom education delivery 1350; data analytics processing 1352; transaction processing 1354; and inverse synthesis 1356. Various embodiments of the present invention can utilize the cloud computing environment described with reference to FIGS. 12 and 13 to generate one or more recommended chemical reactor 108 control settings and/or autonomously operated one or more chemical reactors to facilitate the experimental discovery of polymers belong to a target polymer class.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 14:
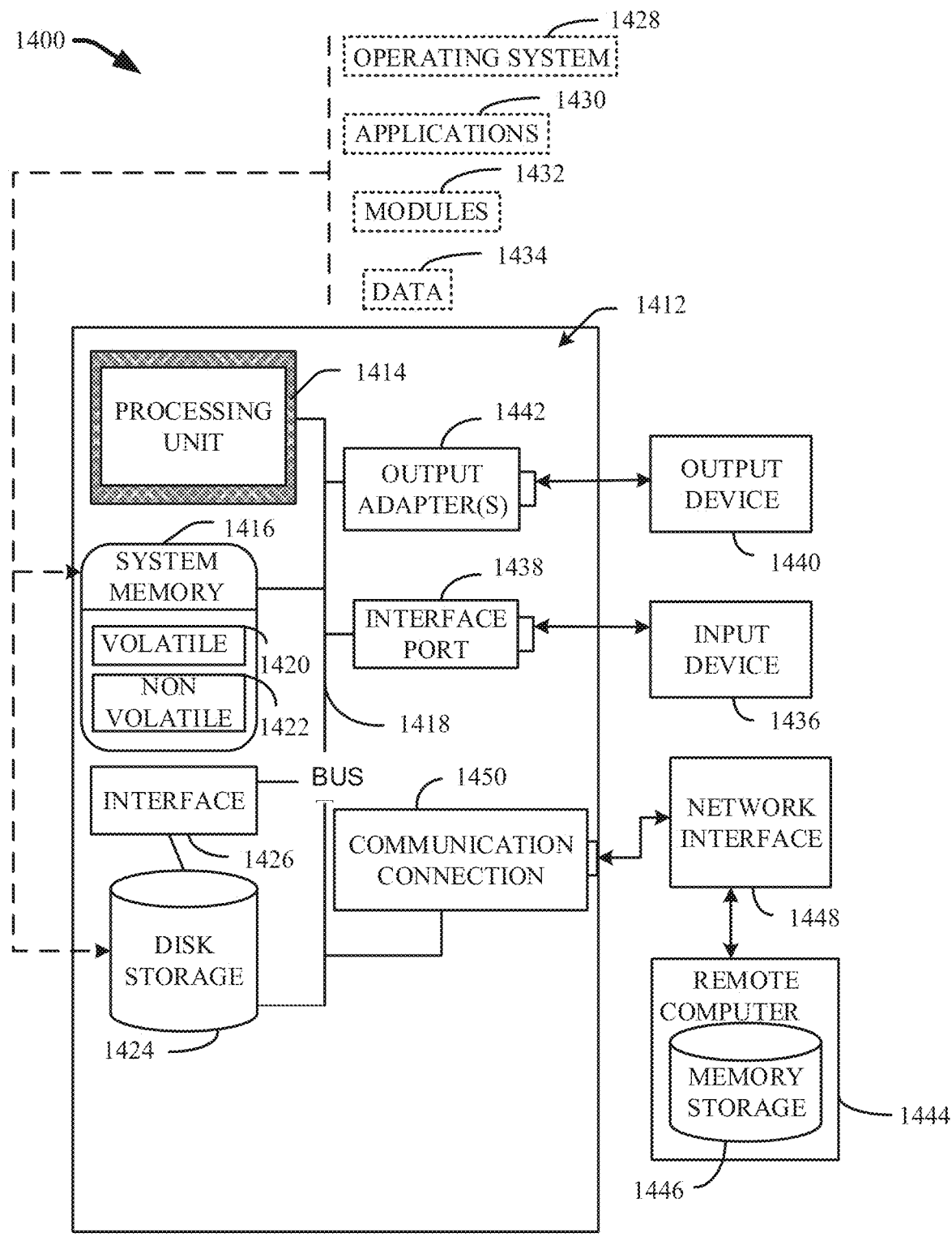
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment in which one or more embodiments described herein can be facilitated. Repetitive description of like elements employed in other embodiments described herein is omitted for sake of brevity. With reference to FIG. 14, a suitable operating environment 1400 for implementing various aspects of this disclosure can include a computer 1412. The computer 1412 can also include a processing unit 1414, a system memory 1416, and a system bus 1418. The system bus 1418 can operably couple system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, can be stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface can be used, such as interface 1426. FIG. 14 also depicts software that can act as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 can take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through one or more input devices 1436. Input devices 1436 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1414 through the system bus 1418 via one or more interface ports 1438. The one or more Interface ports 1438 can include, for example, a serial port, a parallel port, a game port, and a universal serial bus (USB). One or more output devices 1440 can use some of the same type of ports as input device 1436. Thus, for example, a USB port can be used to provide input to computer 1412, and to output information from computer 1412 to an output device 1440. Output adapter 1442 can be provided to illustrate that there are some output devices 1440 like monitors, speakers, and printers, among other output devices 1440, which require special adapters. The output adapters 1442 can include, by way of illustration and not limitation, video and sound cards that provide a means of connection between the output device 1440 and the system bus 1418. It should be noted that other devices and/or systems of devices provide both input and output capabilities such as one or more remote computers 1444.

Computer 1412 can operate in a networked environment using logical connections to one or more remote computers, such as remote computer 1444. The remote computer 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer 1444. Remote computer 1444 can be logically connected to computer 1412 through a network interface 1448 and then physically connected via communication connection 1450. Further, operation can be distributed across multiple (local and remote) systems. Network interface 1448 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory;
a processor, operably coupled to the memory, wherein the processor:
operates a chemical reactor in accordance with a recommended chemical reactor control setting to generate a polymer;
determines a characteristic of the polymer generated by the chemical reactor; and
determines whether the characteristic is within a permissible range defined by a target polymer characteristic; and
generates a recommended chemical reactor control setting for inverse synthesis of the polymer based on the target polymer characteristic and reactor training data.

2. The system of claim 1, wherein the processor also:
generates an adjacency matrix based on the reactor training data, wherein the reactor training data comprises a plurality of reactor control settings, and generates the adjacency matrix by combining the plurality of reactor control settings into a plurality of control setting tuples.

3. The system of claim 2, wherein the plurality of reactor control settings regard reactor parameters previously used to generate a synthesized polymer, and wherein the reactor training data further comprises a characteristic of the synthesized polymer.

4. The system of claim 2 wherein the processor also:
performs a link prediction in network based on the adjacency matrix with at least one partition.

5. The system of claim 4, wherein the link prediction in network comprises a process selected from a group consisting of a matrix factorization, a tensor factorization, and a deep learning model for a network completion task applied to the adjacency matrix.

6. The system of claim 1, wherein the processor also:
updates the reactor training data with the characteristic of the polymer and the recommended chemical reactor control setting.

7. The system of claim 1, wherein the processor also:
computes latent embedding of an initial adjacency matrix to generate a reconstructed adjacency matrix, wherein the initial adjacency matrix comprises the reactor training data, and
performs an entry-wise comparison of the initial adjacency matrix and the reconstructed adjacency matrix.

8. A computer-implemented method, comprising:
operating, by a system, operatively coupled to a processor, a chemical reactor in accordance with a recommended chemical reactor control setting to generate the polymer,
determining, by the system, a characteristic of the polymer generated by the chemical reactor;
determining, by the system, whether the characteristic is within a permissible range defined by a target polymer characteristic; and
generating, by a system operatively coupled to a processor, the recommended chemical reactor control setting for inverse synthesis of the polymer based on the target polymer characteristic and reactor training data.

9. The computer-implemented method of claim 8, further comprising:
training, by the system, a machine learning algorithm based on the reactor training data via an adjacency matrix, wherein the reactor training data regards a synthesis of a previously generated polymer.

10. The computer-implemented method of claim 9, wherein the training comprises:
computing a latent embedding of the adjacency matrix to generate a reconstruction adjacency matrix.

11. The computer-implemented method of claim 9, further comprising:
performing, by the system, a link prediction in network analysis based on the adjacency matrix with at least one partition, wherein the link prediction in network analysis is selected from a group consisting of: a matrix factorization, a tensor factorization, and a deep learning model for a network completion task applied to the adjacency matrix.

12. A computer program product for controlling a chemical reactor to produce a polymer, the computer program product comprising a computer readable storage medium having program instructions embodied therewith, the program instructions executable by a processor to cause the processor to:
operate, by a system operatively coupled to the processor, a chemical reactor in accordance with the recommended chemical reactor control setting to generate the polymer; and
generate, by a system operatively coupled to the processor, a recommended chemical reactor control setting for inverse synthesis of the polymer based on a target polymer characteristic and reactor training data.

13. The computer program product of claim 12, wherein the program instructions further cause the processor to:
collect, by the system, the reactor training data via a cloud computing environment.

14. The computer program product of claim 12, wherein the program instructions further cause the processor to:
train, by the system, a machine learning algorithm based on the reactor training data via an adjacency matrix, wherein the reactor training data regards a synthesis of a previously generated polymer.

15. The computer program product of claim 14, wherein the program instructions further cause the processor to:
perform, by the system, a link prediction in network analysis based on the adjacency matrix with at least one partition, wherein the link prediction in network analysis is selected from a group consisting of: a matrix factorization, a tensor factorization, and a deep learning model for a network completion task applied to the adjacency matrix.

* * * * *